| United States Patent [19] | [11] Patent Number: 4,594,367 |
| Geissel Francis A. et al. | [45] Date of Patent: Jun. 10, 1986 |

[54] ANTISTATIC COMPOSITION AND ARTICLES MADE THEREFROM

[75] Inventors: Geissel Francis A., Agincourt, Canada; William W. Alexander, Belcamp; John Rys-Sikora, Bel Air, both of Md.

[73] Assignee: Bata Limited, Ontario, Canada

[21] Appl. No.: 718,441

[22] Filed: Apr. 1, 1985

[51] Int. Cl.$^4$ .............. A43B 1/14; C09G 1/00; C08K 5/15; C08K 5/09

[52] U.S. Cl. .................. 523/167; 524/109; 524/114; 524/297; 524/321; 524/399; 524/521; 524/912; 36/87; 36/DIG. 2

[58] Field of Search .......... 524/109, 521, 26, 114, 524/912, 399, 321, 297; 523/167; 36/87, DIG. 2

[56] References Cited

U.S. PATENT DOCUMENTS

| 4,193,890 | 3/1980 | Sidi | 524/109 |
| 4,271,052 | 6/1981 | Blackshaw | 524/109 |
| 4,438,230 | 3/1984 | Schwarz | 524/151 |
| 4,447,569 | 5/1984 | Brecker et al. | 524/109 |

FOREIGN PATENT DOCUMENTS

| 6157441 | 12/1981 | Japan | 524/521 |
| 2034329 | 6/1980 | United Kingdom | 524/521 |
| 0870416 | 10/1981 | U.S.S.R. | 524/912 |
| 0891713 | 12/1981 | U.S.S.R. | 524/521 |

*Primary Examiner*—Herbert J. Lilling
*Attorney, Agent, or Firm*—Holman & Stern

[57] ABSTRACT

An antistatic polymer blend composition and articles made therefrom are disclosed. The composition comprises, based on parts by weight: (a) polyvinyl chloride: 100 parts; (b) carboxylated nitrile terpolymer: 30–40 parts; (c) nonionic antistatic agent: 5–8 parts; (d) metallic stabilizers: 2–5 parts; (e) epoxidized oil: 5–10 parts; (f) primary plasticizer: 50–90 parts; and (g) lubricant: 1–2 parts. A method of protection against the effects or build up of antistatic electricity employing articles made from the composition of the present invention is also disclosed.

7 Claims, No Drawings

ANTISTATIC COMPOSITION AND ARTICLES MADE THEREFROM

BACKGROUND OF THE INVENTION

1. Technical Field

The present invention is directed to a flexible antistatic composition and articles made therefrom. More particularly, the present invention is related to antistatic footwear, calendered sheets and other shaped articles required to be antistatic, such antistatic property being maintained substantially undiminished during useful life of the article. The articles and products also have oil-resistant and dust-repellant properties.

2. Prior Art

Polymer compositions have been made antistatic by various means, e.g., incorporating ionic or non-ionic antistatic agents, metal flakes or structured carbons and the like in the polymer formulation. However, such compositions or products made therefrom suffer from certain disadvantages: (1) Metal flakes are needed in relatively large amounts in order to render the product antistatic because of embedding required in the plastics mass. (2) Structured carbon becomes less conductive due to breaking of graphite structure by repeated flexing. (3) Antistatic agents are required in relatively large amounts. Large amount of antistatic agents results in limited compatibility with the polymer and these agents begin to exude and leach out over a period of time resulting in loss of antistatic property.

Surface treatment of products with antistatic agents is usually not long-lasting and wears out within a certain period of time necessitating frequent or repeated treatment.

In contrast, the composition of the present invention provides an improved formulation containing metallic stabilizers and having advantages over heretofore known products while satisfying the commercial and industrial expectations, particularly with respect to antistatic property.

SUMMARY OF THE INVENTION

It is, therefore, an object of the present invention to provide a polymer blend composition capable of dissipating static electricity and providing protection against undesirable effects, e.g., shock or damage, produced by static electricity.

It is a further object of the present invention to provide polymer blend composition capable of retaining, without substantial loss, antistatic property during the life of the product made from such composition.

It is yet another object of the present invention to provide a method of protecting against undesirable effects of static electricity employing products or devices made from the composition of the present invention.

It is a still further object of the present invention to provide long lasting, dust resistant, flexible, antistatic, product maintaining these properties at high, low and ambient temperatures and humidity.

Other objects and advantages will become apparent as the detailed description of the invention proceeds.

DETAILED DESCRIPTION OF THE INVENTION

These and other objects and advantages of the present invention are achieved by a thermoplastic polymer blend composition comprising carboxylated nitrile copolymer (XNBR) in combination with polyvinyl chloride resin (PVC), non-ionic antistatic agent and metallic stabilizers.

Although any suitable resin compatible with the formulation of the present invention can be used, polyvinyl chloride (PVC) resin is preferred. The PVC resin should be a homopolymer (mass or suspension) with a K value of about 65-75 (Fikentscher Method).

Carboxylated nitrile copolymer (XNBR) required to prepare the blend of the present invention is obtained in commercially available form from Polysar Corporation, Sarinia, Canada. The XNBRs used in the preparation of the present blends are more specifically described in the U.S. Pat. Nos. 4,271,052 and 4,438,230 which are incorporated herein by reference.

It should be noted that XNBR are quite different from conventional nitrile rubbers in having various desirable properties, e.g. XNBR extrude faster and flow more readily at moulding temperature, provide harder, tougher vulcanizates, tensile strength and the like. Furthermore, it should be noted that XNBR is a terpolymer whereas conventional nitrile rubber is a copolymer. Thus, they are chemically distinct entities. Among various XNBRs available, Krynac 221 from Polysar, supra, is preferable.

Any suitable non-ionic antistatic agent can be employed in the formulation of the present invention. Preferred, however, is alkyl ethoxylate blend, e.g. Markstat AL-15 manufactured by Argus Chemical Corporation, Brooklyn, New York. Ionic antistatic agents are not employed in the formulation of the present invention.

In contrast to the teachings of certain prior art, the present invention particularly employs commercially available standard metallic stabilizers. Suitable examples of metallic stabilizers are tin, barium-cadmium-zinc (Ba-Cd-Zn) complex and the like.

Additives such as plasticizers, coupling agents, lubricants, flame-retardants, coloring agents and the like are also incorporated as needed in the blend of the present invention to obtain desired flexibility and softness, easier processability and other desirable characteristics in the product.

Preferred plasticizer is primary phthalates e.g. DI-2-ethylhexyl phthalate. Phthalate plasticizers could also be partially replaced with adipate plasticizers. An example of the coupling agent is organo-titanate. Expoxidized soyabean oil or tallates are preferred as epoxyplasticizers. Hydrated aluminum trioxide is preferred for enhancing flame retardation. Examples of preferred lubricants for easier processing are low molecular weight polyethylenes, stearic acid and calcium stearate.

The composition of the present invention is also thermoplastic and can be processed through standard extrusion, injection and calendering operations. Of course, it can also be cross-linked by standard chemical methods.

An advantage of the present invention is that it can also be made in any color with the addition of suitable coloring agents such as organic or inorganic pigments, the color obtained being stable under normal usage and exposure to environmental conditions.

The term "stable" as used herein means the composition or the product retains its original property (e.g. color, antistatic and dust repellant characteristics) without substantial change in said property under ordinary conditions and normal usage of the product. The term "substantial" means more than what would be expected under normal conditions.

Low, high and ambient temperatures designate those temperatures conditions which are usually encountered in various parts of the world during various seasons. For instance, the ambient temperature may be in the range of about 20° C. to 30° C., the low temperatures may be in the range of 5° C. to −10° C. and the high temperatures may be in the range of 35° C. to 45° C., particularly on the black topped pavements, roads and the like.

Products which can be made from the composition of the present invention include articles which provide safety from static-electric shock or are anti-static. The term "anti-static" means unable to acquire, accumulate, hold up or build static-electricity at a level which is undesirable by common industry and commercial preferences.

For instance, a shoe to be antistatic, it must be conductive to a certain extent in order to prevent a built up of static electrical charges. However, this conductivity must be minimal in order to allow for the dissipation of charges and prevent electrical shocks arising from faulty electrical device or equipment. Examples of such articles are antistatic footwear (shoes, shoe-soles and the like); antistatic floor-covering; antistatic upholstery; antistatic seals and insulation; oil, heat and dust resistant articles, computer terminal connections, electronic equipment components and the like where inter alia protection against static electricity is particularly desired.

A polymer composition of the present invention can be prepared by blending various ingredients as follows, (based on 100 parts of PVC resin): (a) PVC resin: 100 parts; (b) XNBR: 10-50 parts; preferably 30-40 parts; (c) non-ionic antistatic agent: 3-10 Parts, preferably 5-8 parts; (d) metallic stabilizers: 1-10 parts, preferably 2-5 parts; (e) plasticizer: 10-120 parts, preferably 20-90 parts; (f) epoxy plasticizer: 3-15 parts, preferably 5-10 parts; (g) coupling agent: 0.2-0.5 parts, preferably 0.025-0.4 parts; (h) lubricant: 0.5-5.0 parts, preferably 0.5-2.0 parts, and (i) flame retardant: 2-10 parts, preferably 3-6 parts.

Coloring agent(s) are added in an amount sufficient to produce the desired color in the product.

Preferred embodiments of the polymer composition and products made therefrom are exemplified hereunder in Tables 1-3. Table 1 shows a white polymer blend; Table-2 a black upper; and Table-3 a gray sole.

The physical properties of the products illustrated in Tables 1-3 are shown in Table 4. The methods employed to determine the physical properties are well known in the art and described in standard literature (ASTM) which are cited in Table 4 and incorporated herein by reference. Parameters of certain tests are listed in Table 5.

TABLE 1

POLYMER RESIN BLEND COMPOSITION

White Antistatic PVC

| Components | PHR* |
|---|---|
| PVC Resin | 100.0 |
| $Al_2O_3.3H_2O$ Hydral 710B - (fire retardent) | 5.0 |
| Jay Flex 77 - (Diisoheptyl Plasticizer) | 77.0 |
| DHP (Diisohexylphthalate) | 8.5 |
| Epoxidized Soybean Oil | 12.0 |
| Tin | 2.0 |
| KR-55 (Titanate) | 0.05 |
| Zinc Stearate | 0.10 |
| Stearic Acid | 0.50 |
| Titanium Dioxide (color-white) | 2.2 |
| Krynac 221 (Carboxylated Nitrile) | 30.0 |
| Markstat AL-15 (Non-ionic Antistatic) | 5.0 |
| Ultramarine Blue (whitening agent) | 0.005 |

*PHR = Parts per hundred of resin (PVC).

TABLE 2

POLYMER RESIN BLEND COMPOSITION

AWS-60 Antistatic Black Welpak Upper

| Components | PHR* |
|---|---|
| PVC Resin | 100.0 |
| $Al_3O_2.3H_2O$ Hydral 710B - (fire retardent) | 6.0 |
| Jay Flex 77 - (Diisophephtyl Plasticizer) | 84.0 |
| DHP (Diisohexylphthalate) | 10.0 |
| Epoxidized Soybean Oil | 10.0 |
| Tin | 2.0 |
| KR-55 (Titanate) | 0.030 |
| Stearic Acid | 1.0 |
| Krynac 221 (Carboxylated Nitrile) | 30.0 |
| Markstat AL-15 (Non-ionic Antistatic) | 6.0 |
| Carbon Black Batch | 2.5 |
| Calcium Stearate | 0.2 |

*PHR = Parts per hundred of resin (PVC).

TABLE 3

POLYMER RESIN BLEND COMPOSITION

AWS-25 Antistatic Gray Welpak Sole

| Components | PHR* |
|---|---|
| PVC Resin | 100.0 |
| $Al_2O_3.3H_2O$ Hydral 710B - (fire retardent) | 6.0 |
| Jay Flex 77 - (Diisohephtyl Plasticizer) | 71.7 |
| DHP (Diisohexylphthalate) | 8.5 |
| Epoxidized Soybean Oil | 8.5 |
| Tin | 1.7 |
| KR-55 Titanate | 0.026 |
| Stearic Acid | 1.0 |
| Titanium Dioxide (color-white) | 2.0 |
| Krynac 221 (Carboxylated nitrile) | 30.0 |
| Markstat AL-15 (Non-ionic Antistatic) | 6.0 |
| Carbon Black Batch | 0.05 |
| Calcium Stearate | 0.2 |

*PHR = Parts per hundred of resin (PVC).

TABLE 4

PHYSICAL PROPERTIES/PROCESSING PARAMETERS

| | White | Black | Gray |
|---|---|---|---|
| Sp. Gr. (ASTM D-792-66) | 1.15-1.20 | 1.15-1.20 | 1.15-1.20 |
| Hardness-Shore A (ASTM/D-2240-75) | 60-70 | 60-70 | 60-70 |
| Taber Abrasion-6000 Cycles H-18 Wheel; 1 kg. Load; Loss grams ASTM D-1044-78 | Max. 2.5 g. | Max. 2.5 g. | Max. 2.5 g. |
| Tear Strength lbs./in. (ASTM D 624-73 Die B) | 160-200 | 180-200 | 180-200 |
| Low Temperature Flex - 20 F | 60,000 | 40,000 | 40,000 |
| Notched Sample Complete Cracking | Flexes | Flexes | Flexes |
| U.V. Exposure (6 hrs.) | Slight Discoloration | No Change | Slight Discoloration |
| Plasticizer Loss - 3 hrs. @ 130 C | Max. 1% | Max. 1% | Max. 1% |
| Injection Temperatures | 350-400° F. | 350-400° F. | 350-400° F. |
| Calendering Temperatures | 280-320° F. | 280-320° F. | 280-320° F. |
| Extrusion Temperatures | 350-400° F. | 350-400° F. | 350-400° F. |
| Surface Resistivity (Ohms/inch$^2$) ASTM D 257-78 | $2.68 \times 10^9$ | $1.08 \times 10^9$ | $1.08 \times 10^9$ |

TABLE 5

| All Test Samples were 6 mm Thick | | |
|---|---|---|
| IMMERSION TESTS (72 Hours) | | |
| | Initial Resistance | Resistance After 72 Hours |
| Water | $1.6 \times 10^7$ Ohms | $1.1 \times 10^7$ Ohms |
| Hydraulic Oil | $1.5 \times 10^7$ Ohms | $1.9 \times 10^7$ Ohms |
| ASTM Oil #3 | $1.6 \times 10^7$ Ohms | $8.0 \times 10^6$ Ohms |
| Aging @ 100° C. | | |
| Initial Resistance - $1.2 \times 10^7$ Ohms | | |
| After 24 Hours - $2.5 \times 10^7$ Ohms | | |
| Ultraviolet Light Exposure | | |
| Initial Resistance - $1.6 \times 10^7$ Ohms | | |
| After 6 Hours - $2.5 \times 10^7$ Ohms | | |

Considered antistatic between $1 \times 10^5$–$1 \times 10^8$ Ohms.
Tests were performed on an Antistatic and Conductive Footwear Tester obtained from:
BTR Silvertown Limited
Horninglow Road
Burton-on-Trent, Staffs DE130SN.

We claim:

1. A polymer blend composition consisting essentially of, based on parts by weight: (a) polyvinyl chloride: 100 parts; (b) carboxylated nitrile copolymer: 30–40 parts; (c) nonionic antistatic agent: 5–8 parts; (d) metallic stabilizers; 2–5 parts; (e) epoxidized oil: 5–10 parts; (f) primary phthalate or adipate plasticizer: 50–90 parts; and (g) lubricant selected from the group consisting of stearic acid, zinc stearate, calcium stearate and low molecular weight polyethylenes: 1–2 parts; the resulting polymer blend being antistatic and flexible.

2. The composition of claim 1 further comprising metallic coupling agent 0.3–0.4 parts.

3. The composition of claim 2 further comprising sufficient amount of pigments to provide desired color to the composition.

4. The composition of claim 1 capable of maintaining antistatic property without substantial loss of said property at low, ambient or higher temperature and being flexible at normal and low temperature.

5. An antistatic article made from the composition of claim 1.

6. The article of claim 5 being a shoe, shoe-sole or components thereof.

7. A method of protecting against effects of static electricity comprising employing an article made from the composition of claim 1.

* * * * *